UNITED STATES PATENT OFFICE 2,623,147

COATED WELDING ROD

Paul Christiaan van der Willigen, Eindhoven, Netherlands, assignor to Hartford National Bank and Trust Company, Hartford, Conn., as trustee No Drawing. Application February 16, 1950, Serial No. 144,604. In the Netherlands February 19, 1949

4 Claims. (Cl. 219—8)

This invention relates to coated welding rods comprising an iron core, for electric arc welding by touch welding, in which the coating comprises titanium dioxide, carbohydrate, silicate and a suitable amount of powdery iron, i. e. from 15% to 50% by weight of the total weight of iron contained in the welding rod. It has been found that a welding seam produced by touch welding with the use of such a welding rod often shows cracks.

In electric arc touch welding, the welding rod is continuously in contact with the workpiece, the core of the rod having a coating which has a high softening temperature so that the rim of the crater formed in the welding end of the rod by the arc may rest continuously in contact with and on the workpiece.

The object of the invention is to mitigate this drawback.

According to the invention a coated welding rod for electric arc welding by touch welding, comprises an iron core and a coating containing powdery iron, so that the total amount of iron constitutes from 75% to 86% of the total weight of the coated welding rod and from 15% to 50% by weight of this iron is contained as powdery iron in the coating, the rest of the coating substantially being of the following composition:

| | Percent by weight |
|---|---|
| Titanium dioxide | 10 to 50 |
| Carbohydrate | 10 to 30 |
| Silicate | 20 to 40 |
| Manganese alloy (such as ferromanganese) | up to 10 |
| Manganese compound capable of evolving oxygen at welding temperatures | 3 to 30 |

The invention also relates to a method of electric arc welding by touch welding in which use is made of a welding rod according to the invention.

It is not intended to limit the scope of the invention to any theoretical explanation or theory. For the sake of completeness it is, however, observed that an excess amount of carbon, presumably originating from the organic material contained in the coating, may find its way into the welding seam to result in the production of cracks, and such production of cracks may be facilitated due to the fact that in touch welding, in which the rim of the crater formed in the welding rod rests on the workpiece, atmospheric oxygen cannot readily penetrate into the zone of the arc and oxidise said excess carbon. Consequently, a possible explanation of the improved effect obtained with the use of a welding rod according to the invention is that oxygen evolved from the manganese compound capable of evolving oxygen at welding temperatures reacts with the excess carbon and thus decreases the amount of carbon in the welding seam.

The use of a manganese compound capable of evolving oxygen at welding temperatures affords the advantage that while the production of cracks is decreased, no undesired additional effect is evolved.

For the sake of completeness, it is mentioned that the invention does not relate to known coated welding rods in which the coating contains a compound capable of evolving oxygen at welding temperatures such, for example, as iron oxide, and with the use of which the occurrence of cracks is not high, but relates only to the improvement of the known welding rod the coating of which comprises titanium dioxide, carbohydrate, silicate and a suitable amount of powdery iron, i. e. from 15% to 50% by weight, to which coating the addition of a manganese compound capable of evolving oxygen at welding temperatures decreases the production of cracks otherwise produced in the welding seam without involving an undesired additional effect.

Welding rods according to the invention will preferably comprise an increased amount of manganese compound capable of evolving oxygen at welding temperatures, with increase in the carbohydrate content of the welding rod coating.

Examples of manganese compounds capable of evolving oxygen at welding temperatures and which may be used singly or in combination are hausmannite, potassium permanganate and pyrolusite. Pyrolusite is particularly suitable on account of its high stability and its high available oxygen content.

It has furthermore been found that it is possible to leave out manganese alloys, such as ferro-manganese, from the welding rod coating according to the invention if the coating contains a large amount of carbohydrate, viz. from 18% to 30% by weight, and also a large amount of manganese compound capable of evolving oxygen at welding temperatures viz. from 12% to 30% by weight of the non-ferrous constituents. In this case, during welding, a sufficient amount of manganese metal is available from the manganese compound capable of evolving oxygen at welding temperatures to impart to the weld the desired good mechanical properties.

Welding rods comprising a large amount of carbohydrate organic material and evolving a large amount of gas during welding bring about deep burning-in, which in certain cases may be desirable. The thickness of the coating of a welding rod according to the invention is preferably chosen to be such that the diameter of the welding rod is at least $1.3d+1.0$ mm. where $d$ is the diameter of the core.

An example of a coated welding rod according to the invention has an outer diameter of 6.8 mms., and contains an iron core wire having a diameter of 4 mms. The coating material is obtained by mixing 43 parts by weight of rutile, 8 parts by weight of ferromanganese (85% by weight of manganese), 12 parts by weight of kaolin, 12 parts by weight of woodflour and 4 parts by weight of potassium permanganate with 60 parts by weight of a 35%-solution of waterglass and 65 parts by weight of powdery iron. The welding rod has a total iron content of about 78% by weight.

An example of a coated welding rod according to the invention, the coating of which does not contain manganese alloys, such as ferromanganese has a 4 mm. diameter iron core wire having a manganese content of 0.40% by weight coated to an outer diameter of 7 mms. with a material obtained by mixing 12 parts by weight of rutile, 13 parts by weight of kaolin, 21 parts by weight of woodflour, 4 parts by weight of calcspar, 21 parts by weight of pyrolusite, 50 parts by weight of a 35%-solution of water-glass with 85 parts by weight of powdery iron. The manganese content of the welding metal melted down is 0.50% by weight. From this it is obvious that manganese metal during welding is produced and absorbed in the welding seam in sufficient quantity to impart thereto the desired good mechanical properties.

What I claim is:

1. A coated welding rod for electric arc welding by touch welding, comprising an iron core and a coating containing powdery iron so that the total amount of iron constitutes from 75% to 86% of the total weight of the coated welding rod and from 15% to 50% by weight of this iron is contained as powdery iron in the coating, the rest of the coating substantially being of the following composition:

| | Percent by weight |
|---|---|
| Titanium dioxide | 10 to 50 |
| Carbohydrate | 10 to 30 |
| Silicate | 20 to 40 |
| Manganese alloy | up to 10 |
| Manganese compound capable of evolving oxygen at welding temperatures | 3 to 30 |

2. A welding rod as claimed in claim 1, in which pyrolusite is used as the manganese compound capable of evolving oxygen at welding temperatures.

3. A welding rod for electric arc welding by touch welding, comprising an iron core and a coating containing powdery iron so that the total amount of iron constitutes from 75% to 86% of the total weight of the coated welding rod and from 15% to 50% by weight of this iron is contained as powdery iron in the coating, the rest of the coating substantially being of the following composition:

| | Percent by weight |
|---|---|
| Titanium dioxide | 10 to 50 |
| Carbohydrate | 18 to 30 |
| Silicate | 20 to 40 |
| Manganese compound capable of evolving oxygen at welding temperatures | 12 to 30 |

4. A welding rod for electric arc welding by touch welding, comprising an iron core having a diameter of approximately 4 mm. and a coating containing powdery iron so that the total amount of iron constitutes from 75% to 86% of the total weight of the coated welding rod and from 15% to 50% by weight of this iron is contained as powdery iron in the coating, the rest of the coating substantially being the following composition:

| | Percent by weight |
|---|---|
| Titanium dioxide | 10 to 50 |
| Carbohydrate | 18 to 30 |
| Silicate | 20 to 40 |
| Manganese compound capable of evolving oxygen at welding temperatures | 12 to 30 | whereby the melted manganese content of said welding rod is approximately 0.50% by weight.

PAUL CHRISTIAAN van der WILLIGEN.

REFERENCES CITED

The following references are of record in the file of this patent:

UNITED STATES PATENTS

| Number | Name | Date |
|---|---|---|
| 1,374,711 | Armor | Apr. 12, 1921 |
| 2,009,240 | Roberts et al. | July 23, 1935 |
| 2,141,938 | Shepherd | Dec. 27, 1938 |
| 2,164,775 | Miller | July 4, 1939 |
| 2,210,777 | Rasmussen | Aug. 6, 1940 |
| 2,408,619 | Friedlander | Oct. 1, 1946 |
| 2,408,620 | Friedlander | Oct. 1, 1946 |
| 2,429,175 | Willigen | Oct. 14, 1947 |
| 2,490,179 | Willigen et al. | Dec. 6, 1949 |
| 2,504,630 | Bienfait et al. | Apr. 18, 1950 |

FOREIGN PATENTS

| Number | Country | Date |
|---|---|---|
| 394,319 | Great Britain | June 9, 1933 |
| 417,195 | Great Britain | Oct. 1, 1934 |